Registered Oct. 9, 1934

1,976,363

UNITED STATES PATENT OFFICE 1,976,363

METHOD OF MANUFACTURING MOTTLED MOLDED ARTICLES

Dennis E. Northrup, Kingsport, Tenn., assignor to Eastman Kodak Company, Rochester, N. Y., a corporation of New York No Drawing. Application September 11, 1931, Serial No. 562,422

3 Claims. (Cl. 18—61)

This invention relates to the production from thermoplastic cellulosic materials, of molded articles having a vari-colored or mottled appearance, and more particularly to a process for the production of these articles from an improved type of cellulose acetate molding powder.

It has heretofore been the practice in making objects of thermoplastic cellulosic material to grind or pulverize the cellulose compound with a plasticizer and subject the comminuted material to the action of heat and pressure in a mold of the desired form. The cellulosic materials thus far available for this purpose, usually cellulose nitrate, cellulose acetate, and similar derivatives of this general character, do not lend themselves readily to such processes for the reason that, as ordinarily produced, the particles thereof are not of a sufficiently open or porous structure to permit thorough incorporation of plasticizing agents even after extensive grinding and comminution. Another method for the manufacture of varicolored molded articles is to skive slabs from pre-formed blocks of plastic cellulose ester material of different colors which require curing for relatively long periods of time to provide for complete removal of solvents. After this extensive curing process, the slabs are comminuted by passing them through saws, hammer-mills, or other chip-forming apparatus, which invariably gives rise to the production of considerable dust. These detrimental features necessarily add appreciably to the expense of manufacture, and, in addition, are inconvenient and time-consuming.

I have now discovered a process wherein these expensive and unwieldy mechanical grinding operations of the prior art may be dispensed with and wherein thorough incorporation of the plasticizer is assured, my process as herein described being particularly designed for the production of mottled or variegated color effects in the molded product.

My invention has as an object to provide a process for the production of mottled or varicolored articles from thermoplastic organic cellulose derivatives. A further object is to provide a molding process wherein grinding operations are eliminated and wherein the molding material is plasticized in a simple and convenient manner. A still further object is to provide a new method of producing varicolored molding powders in a physical form convenient for use in making mottled castings. Another object is to provide molding processes wherein a new and improved type of molding powder is employed. Other objects will appear hereinafter.

The invention may be said to comprise the production of an organic cellulose ester in a condition which is readily available for carrying out molding operations. One of its preferred forms consists in thoroughly mixing a new type of organic cellulose ester molding powder having an open, porous, granular structure, and a plasticizer, with a liquid mixture comprising two essential ingredients, namely, a common solvent for ester and plasticizer, and a non-solvent for the ester, followed by evaporation of the solvent mixture and drying of the plasticized ester in the form of a relatively thin cake. The desired coloring material is added to the mixture before evaporation of the liquid constituents to provide for the desired coloring of the dried cake. Different colored cakes are prepared in the same manner and broken up into fragments of the required size. These fragments are placed in molds of the desired shape and subjected to heat and pressure with the result that a varicolored article is produced.

According to another form of the invention, preparation of the colored cake begins during the final stages of the precipitation process in which the finely divided cellulose acetate or other organic ester is produced. In this case, a coloring material, such as a dye or pigment, is added to the precipitating bath and thereafter the solvents and precipitants are evaporated off, leaving the solid material in the form of a relatively thin solid colored cake. As in that form of the invention described in the preceding paragraph, the colored cake is dried, broken up, and mixed with fragments of similar material and the mixture of varicolored fragments is used in various molding operations as desired.

In still another form of the invention, the plasticized, precipitated cellulose acetate powder is made up into tablets or pellets of different colors by passing the powder through a tableting machine such as used in the pharmaceutical industry. Various color combinations of these tablets may then be used in the molding process to produce articles having the desired multi-colored effect.

It is to be noted that a certain limited amount of solvent is retained by the dried or precipitated cake to provide for a limited solvent action on the surfaces of the individual grains or particles so that they may cohere or stick together and form a relatively solid cake. Such solvent action must not, however, be sufficient to destroy the characteristic granular structure of the particles and, therefore, should be regulated or controlled by regulating the amount of non-solvent used with respect to the amount of solvent, it being evident that the more non-solvent employed, the less will be the residual solution of the cellulose acetate and the lower will be the density of the cake.

The invention will now be described with reference to the following examples in which I have set forth several of its preferred embodiments which are included for purposes of illustration and not as a limitation.

*Example I.*—100 grams of cellulose acetate, 50 grams of diethyl phthalate and 400 grams of acetone are stirred until solution takes place. 600 grams of toluene containing .1 gram of crystal violet are then added, whereupon the toluene precipitates the cellulose acetate in the form of a violet colored, finely divided, granular powder, the particles of which are of an open, porous nature having the plasticizer and dyestuff intimately incorporated therein. The solvent and precipitant are then evaporated off without appreciable agitation and the mass of solid material dried in a pan of such size that the resulting cake will be about ¼″ thick, the drying being preferably accomplished in a vacuum oven using a reduced pressure of 5″ of mercury and a temperature of 150° F.

*Example II.*—150 grams of a previously plasticized cellulose acetate molding powder prepared according to the procedure outlined in the application of Amos W. Crane and Dennis E. Northrup, Serial No. 551,508, filed July 17, 1831, which procedure consists in its essential features in precipitating the cellulose acetate from solution as a fine, porous, granular powder by the addition of an organic non-solvent. The plasticized powder is thoroughly stirred into a mixture containing 250 grams of acetone and 250 grams of toluene to which has been added .2 gram of spirit nigrosine R, and the mass dried in a vacuum pan under the same conditions as described in Example I. The resulting thin cake is then broken up and used in the desired molding operation together with fragments of differently colored, but similarly prepared, material.

*Example III.*—100 grams of cellulose acetate and 35 grams of dimethyl phthalate are dissolved in 400 grams of acetone together with .1 gram of acele red. The mixture is filtered and the cellulose acetate precipitated in a plasticized condition by the addition with vigorous agitation of 1200 grams of toluene. The acetone and toluene is then evaporated with constant stirring under a partial vacuum at suitably controlled temperatures. The resulting colored powder is passed through a Stokes tableting machine and the tablets thus formed are mixed with similar tablets of various colors and the mixture molded to the desired form.

While the invention has been described in the above examples with reference to a cellulose acetate molding powder, molding powders prepared from other cellulose esters in accordance with the above-mentioned Crane and Northrup application, such as cellulose propionate, cellulose stearate, or the mixed esters such as cellulose acetate-propionate, cellulose acetate-stearate and the like may be employed in a similar manner. The invention is particularly characterized by the use in molding operations of a new and improved form of these molding powders having an open, porous structure which permits the thorough incorporation of the plasticizer. Further methods of preparing this improved material are described in detail in the application just referred to. The method of production of these powders per se is, of course, a separate and distinct invention from that of the present case.

It will be seen that I have provided a process wherein certain of the steps described in the Northrup and Crane application may be combined with additional steps, which are herein particularly described, to produce a unitary method for the production of plasticized molding powders in a form readily available for the manufacture of varicolored molded articles. The principal specification with regard to the cellulose ester material employed is that it should be produced in this new and improved form in which the particles thereof have an open, porous, granular structure which permits their thorough impregnation by the plasticizing agent.

The above examples indicate the use of a coloring agent in order to give the fragments or pellets the desired appearance. This may take the form of a dye, such as acele red, or it may be a pigment, gold or aluminum leaf, pearl essence, or other coloring materials which will suggest themselves to those skilled in the art. Although no definite rules need be laid down with regard to the use of the various dyes, they should be compatible with the particular plasticizer employed. For example, when using diethyl or dimethyl phthalate as the plasticizer, dyes such as crystal violet or spirit nigrosine R may be used; with the sulfonamides, the rhodamine dyes, typified by rhodamine B, may be employed.

As indicated by the above examples, an unplasticized form of the preciptated, granular, cellulose acetate powder may be employed and the plasticizer subsequently incorporated by dissolving the cellulose ester and plasticizer in a common solvent followed by precipitation of the plasticized acetate by the addition of a cellulose ester non-solvent, as indicated in Example III. In another modification of the invention, previously plasticized cellulose acetate powder is stirred into a liquid mixture comprising a cellulose acetate solvent and a non-solvent containing the desired coloring matter in solution or suspension followed by the evaporation of the solvent mixture and drying of the solid material to form a colored cake.

As indicated by Example III, a plasticized organic cellulose ester powder may be made up into the form of pills or tablets of various colors and these used in the desired color combinations. In all of the forms of the invention herein described, the plasticized cellulose material is formed into fragments, pellets or chips, which are mixed with similar aggregates of different colors and subjected to a molding operation by placing them in a molding die or press of the desired shape and applying sufficient heat and pressure to cause them to flow and flux together.

While many of the conditions of operation suitable for making molded articles according to the invention are well known to those skilled in the plastic art, I may state that, with regard to the temperature, I prefer to use a range of 125° to 150° C., although this may be varied considerably either way depending on the particular esters, plasticizers, and solvents dealt with. The pressure applied to the plastic material in the mold may, for example, range from 2000 to 5000 lbs. per square inch, but here again a wide latitude is operable and will produce good results when employing a cellulose ester plastic prepared according to my process. The time of contact of the plastic with the mold may also vary widely, one-half to five minutes being a preferred range for cellulose acetate, for example.

The plasticizers used will be selected with reference to the particular cellulose ester treated. When using cellulose acetate, for example, any of the known cellulose acetate plasticizers, such as monochlornaphthalene, triphenylphosphate, tricresylphosphate, ethylacetanilide, ethyl p-toluene sulfonamide, and diethyl and dimethyl phthalate may be employed.

In addition to plasticizers and coloring agents, other substances such as fire retardents and filling agents may be incorporated into the caked or pelleted material, depending upon the properties desired in the finished product.

The improved molding material of my invention is characterized by, and distinguished from, known analogous plastic products in the fact that, whether in the form of a cake, chip, pellet, or fragment, it is not a colloidized material, but, on the contrary, an aggregate of minute, closely cohering cellulose ester particles, each of which has an open, porous structure with a plasticizer intimately and thoroughly incorporated throughout and absorbed into its innermost interstices.

What I claim as my invention and desire to be secured by Letters Patent of the United States is:

1. The process of producing a vari-colored decorative article of thermoplastic material which comprises mixing uncolloidized, uniformly colored masses of different colors, each consisting of aggregated plastic particles of finely-divided, porous, granular, cellulose organic ester powders, and then colloidizing the material by subjecting the mixture to the action of heat and pressure.

2. The process of producing a vari-colored decorative article of thermoplastic material which comprises mixing uncolloidized colored broken cakes of different colors, each consisting of cohering plasticized particles of finely-divided porous, granular, cellulose acetate molding powders, and then colloidizing the material by subjecting the mixture to the action of heat and pressure.

3. The process of producing a vari-colored decorative article of thermoplastic material which comprises mixing uncolloidized, uniformly colored fragments of different colors, each consisting of aggregated plasticized particles of finely-divided, porous, granular cellulose acetate molding powders, and then colloidizing the material by subjecting the mixture to a molding operation under heat and pressure.

DENNIS E. NORTHROP.